(12) United States Patent
Lin

(10) Patent No.: US 11,989,894 B2
(45) Date of Patent: *May 21, 2024

(54) METHOD FOR ACQUIRING TEXTURE OF 3D MODEL AND RELATED APPARATUS

(71) Applicant: TENCENT TECHNOLOGY (SHENZHEN) COMPANY LIMITED, Shenzhen (CN)

(72) Inventor: Xiangkai Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 128 days.

This patent is subject to a terminal disclaimer.

(21) Appl. No.: 17/579,072

(22) Filed: Jan. 19, 2022

(65) Prior Publication Data

US 2022/0138974 A1 May 5, 2022

Related U.S. Application Data

(63) Continuation of application No. PCT/CN2020/120797, filed on Oct. 14, 2020.

(30) Foreign Application Priority Data

Jan. 10, 2020 (CN) .......................... 202010027225.1

(51) Int. Cl.
*G06T 7/40* (2017.01)
*G06T 7/33* (2017.01)
(Continued)

(52) U.S. Cl.
CPC ................. *G06T 7/40* (2013.01); *G06T 7/33* (2017.01); *G06T 7/55* (2017.01); *G06T 7/74* (2017.01);
(Continued)

(58) Field of Classification Search
CPC ... G06T 2207/10016; G06T 7/40; G06T 7/20; G06T 2207/10028; G06T 2207/30244;
(Continued)

(56) References Cited

U.S. PATENT DOCUMENTS

| 2018/0025540 A1 | 1/2018 | Ma et al. |
| 2018/0082435 A1* | 3/2018 | Whelan ................... G06T 7/579 |

(Continued)

FOREIGN PATENT DOCUMENTS

| CN | 109242961 A | 1/2019 |
| CN | 109409335 A | 3/2019 |

(Continued)

OTHER PUBLICATIONS

The State Intellectual Property Office of the People's Republic of China (SIPO) Office Action 1 for for 202010027225.1 dated Mar. 30, 2020 10 Pages (including translation).

(Continued)

*Primary Examiner* — Xiao M Wu
*Assistant Examiner* — Scott E Sonners
(74) *Attorney, Agent, or Firm* — ANOVA LAW GROUP, PLLC

(57) ABSTRACT

A method for acquiring a texture of a three-dimensional (3D) model includes: acquiring at least two 3D networks generated by a target object based on a plurality of angles, the at least two 3D networks including a first correspondence between point cloud information and color information of the target object, and first camera poses of the target object; acquiring an offset between 3D points used for recording the same position of the target object in the at least two 3D networks according to the first camera poses respectively included in the at least two 3D networks; updating the first correspondence according to the offset, to acquire a second correspondence between the point cloud information (Continued)

and the color information of the target object; and acquiring a surface color texture of a 3D model of the target object according to the second correspondence.

20 Claims, 9 Drawing Sheets

(51) Int. Cl.
G06T 7/55 (2017.01)
G06T 7/73 (2017.01)
G06T 15/04 (2011.01)
G06T 17/20 (2006.01)

(52) U.S. Cl.
CPC .............. *G06T 15/04* (2013.01); *G06T 17/20* (2013.01); *G06T 2207/10024* (2013.01); *G06T 2207/10028* (2013.01); *G06T 2207/30201* (2013.01); *G06T 2207/30244* (2013.01)

(58) Field of Classification Search
CPC .. G06T 7/73; G06T 7/70; G06T 7/246; G06T 7/74; G06T 19/006; G06T 7/33; G06T 7/50; G06T 7/248; G06T 17/00; G06T 7/292; G06T 2207/10024; G06T 7/80; G06T 15/205; G06T 2200/04; G06T 2207/30196; G06T 19/00; G06T 7/75; G06T 7/337; G06T 2219/2016; G06T 7/55; G06T 2207/20221; G06T 7/38; G06T 15/00; G06T 15/04; G06T 7/174; G06V 20/41; G06V 20/647; H04N 13/239; H04N 13/271; H04N 13/25

See application file for complete search history.

(56) References Cited

U.S. PATENT DOCUMENTS

| 2019/0228569 | A1* | 7/2019 | Chien ................. H04N 13/218 |
| 2021/0183044 | A1 | 6/2021 | Lin et al. |
| 2021/0248763 | A1 | 8/2021 | Gao et al. |
| 2021/0319621 | A1 | 10/2021 | Qiao et al. |

FOREIGN PATENT DOCUMENTS

| CN | 109949412 A | 6/2019 |
| CN | 109979013 A | 7/2019 |
| CN | 110070598 A | 7/2019 |
| CN | 110189400 A | 8/2019 |
| CN | 110349251 A | 10/2019 |
| CN | 110570368 A | 12/2019 |
| CN | 110895823 A | 3/2020 |
| CN | 111325823 A | 6/2020 |
| JP | 2015153405 A | 8/2015 |
| JP | 201745148 A | 3/2017 |

OTHER PUBLICATIONS

The World Intellectual Property Organization (WIPO) International Search Report for PCT/CN2020/120797 dated Jan. 12, 2021 6 Pages.

Xin-Shan Zhu et al., "Real-time human face reconstruction with texture integration based on single depth camera," Transducer and Microsystem Technologies, vol. 36, Issue 8, pp. 126-129, Dec. 31, 2017 (Dec. 31, 2017). 4 pages.

Qian Sun et al., "Registration of Texture Image and Point Clouds Model in 3D Reconstruction," Computer Simulation, vol. 28 Issue 11, pp. 218-221, Nov. 30, 2011 (Nov. 30, 2011). 4 pages.

Yuxia Bian et al., "Error metric model for 3D point cloud reconstruction based on binocular vision," 2017 10th International Congress on Image and Signal Processing, BioMedical Engineering and Informatics (CISP-BMEI), Dec. 31, 2017 (Dec. 31, 2017). 5 pages.

Claudio Ferrari et al., "3D Face Reconstruction from RGB-D Data by Morphable Model to Point Cloud Dense Fitting," ICPRAM 2019, pp. 728-735, Dec. 31, 2019 (Dec. 31, 2019). 8 pages.

European Patent Office European Search Report for Application No. 20912594.7 dated Sep. 30, 2022 9 pages.

Zhou Qian-Yi et al : "Color map optimization for 30 reconstruction with consumer depth cameras", ACM Transactions on Graphics, ACM, NY, US, vol. 33, No. 4, Jul. 27, 2014 (Jul. 27, 2014), pp. 1-10.

Richard A Newcombe et al : "KinectFusion: Real-time dense surface mapping and tracking", Mixed and Augmented Reality (ISMAR), 2011 1O th IEEE International Symposium on, IEEE, Oct. 26, 2011, pp. 127-13.

Anonymou"s : k-nearest neighbors algorithm—Wikipedia", Dec. 14, 2017 (Dec. 14, 2017).

The Japan Patent Office (JPO) Notification of Reasons for Refusal for Application No. 2022-516349 and Translation dated Apr. 4, 2023 6 Pages.

Sehwan Kim, et al.,Projection-based registration using a multi-view camera for indoor scene reconstruction, Fifth International Conference on 3-D Digital Imaging and Modeling (3DIM'05),IEEE,2005 年06月13日, , https://ieeexplore.ieee.org/document/1443282.

* cited by examiner

METHOD FOR ACQUIRING TEXTURE OF 3D MODEL AND RELATED APPARATUS

RELATED APPLICATION(S)

This application is a continuation application of PCT Patent Application No. PCT/CN2020/120797 filed on Oct. 14, 2020, which claims priority to Chinese Patent Application No. 202010027225.1, entitled "METHOD AND APPARATUS FOR ACQUIRING TEXTURE OF 3D MODEL, DEVICE, AND MEDIUM" filed with the China National Intellectual Property Administration on Jan. 10, 2020, all of which are incorporated by reference in entirety.

FIELD OF THE TECHNOLOGY

The present disclosure relates to the field of electronic technologies, and more particularly, to acquisition of a texture of a three-dimensional (3D) model.

BACKGROUND

The face reconstruction technology is a technology that reconstructs a 3D face model from one or more two-dimensional (2D) face images.

In particular, a user may take 2D pictures from different angles according to the instructions of a terminal. The 2D face images acquired through photographing include the color information and depth information of the pictures. In the process of 3D reconstruction, 3D points are back-projected from the depth information. The projected 3D points have a correspondence with pixels in the color information. After the 3D points projected from different 2D images are fused, a reconstructed 3D face model can be acquired. Finally, according to the correspondence, the pixels corresponding to the 3D points in the 3D face model are pasted on the 3D model, so that the texture mapping of the 3D model can be implemented, and the 3D model is colorful.

SUMMARY

The present disclosure provides the following technical solutions:

In an aspect, the present disclosure provides a method for acquiring a texture of a 3D model, performed by a computing device, the method including: acquiring at least two 3D networks generated by a target object based on a plurality of angles, the at least two 3D networks including a first correspondence between point cloud information and color information of the target object, and first camera poses of the target object, the first camera pose being used for representing a displacement of the target object relative to a reference position in response to determining that the 3D network is generated; moving the at least two 3D networks to a same angle according to the first camera poses respectively included in the at least two 3D networks; acquiring a second point closest to a first point in a first network, the second point being in a second network, and the first network and the second network being respectively different 3D networks of the at least two 3D networks; acquiring an offset between the first point and the second point; updating the first correspondence according to the offset, to acquire a second correspondence between the point cloud information and the color information of the target object; and acquiring a surface color texture of a 3D model of the target object according to the second correspondence.

In another aspect, the present disclosure provides an apparatus for acquiring a texture of a 3D model, the apparatus including: a memory storing computer program instructions; and a processor coupled to the memory and configured to execute the computer program instructions and perform: acquiring at least two 3D networks generated by a target object based on a plurality of angles, the at least two 3D networks including a first correspondence between point cloud information and color information of the target object, and first camera poses of the target object, the first camera pose being used for representing a displacement of the target object relative to a reference position in response to determining that the 3D network is generated; moving the at least two 3D networks to a same angle according to the first camera poses respectively included in the at least two 3D networks; acquiring a second point closest to a first point in a first network, the second point being in a second network, and the first network and the second network being respectively different 3D networks of the at least two 3D networks; acquiring an offset between the first point and the second point; updating the first correspondence according to the offset, to acquire a second correspondence between the point cloud information and the color information of the target object; and acquiring a surface color texture of a 3D model of the target object according to the second correspondence.

In yet another aspect, the present disclosure provides a non-transitory computer-readable storage medium storing computer program instructions executable by at least one processor to perform: acquiring at least two 3D networks generated by a target object based on a plurality of angles, the at least two 3D networks including a first correspondence between point cloud information and color information of the target object, and first camera poses of the target object, the first camera pose being used for representing a displacement of the target object relative to a reference position in response to determining that the 3D network is generated; moving the at least two 3D networks to a same angle according to the first camera poses respectively included in the at least two 3D networks; acquiring a second point closest to a first point in a first network, the second point being in a second network, and the first network and the second network being respectively different 3D networks of the at least two 3D networks; acquiring an offset between the first point and the second point; updating the first correspondence according to the offset, to acquire a second correspondence between the point cloud information and the color information of the target object; and acquiring a surface color texture of a 3D model of the target object according to the second correspondence In yet another aspect, the present disclosure provides a method for acquiring a texture of a 3D model, the method including: acquiring at least two 3D networks generated by a target object based on a plurality of angles, the at least two 3D networks including a first correspondence between point cloud information and color information of the target object, and first camera poses of the target object, the first camera pose being used for representing a displacement of the target object relative to a reference position in response to determining that the 3D network is generated; acquiring an offset between 3D points used for recording the same position of the target object in the at least two 3D networks according to the first camera poses; updating the first correspondence according to the offset, to acquire a second correspondence between the point cloud information and the color information of the target object; and acquiring a surface color texture of a 3D model of the target object according to the second correspondence. By updating the correspondence between the point cloud information and the color information, a more precise and subtle alignment between the 3D points and the pixels in the 3D model is realized, and an effect of texture mapping of the 3D model is improved.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
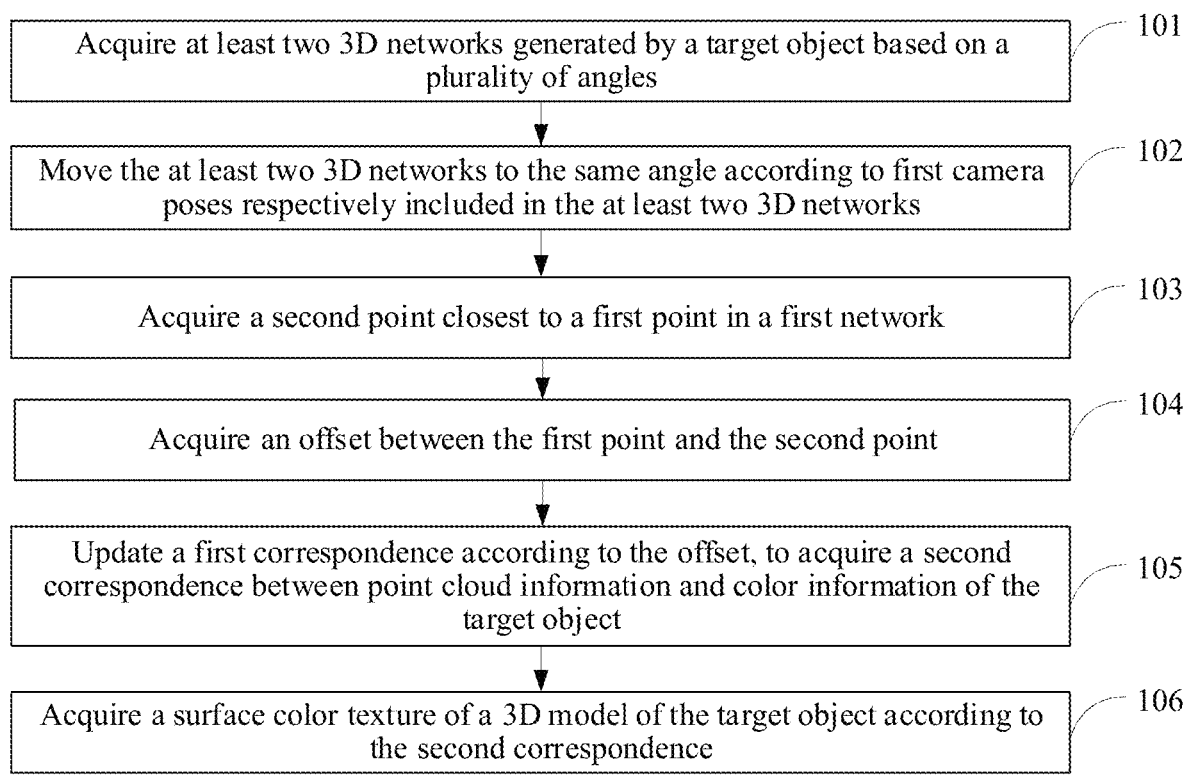
FIG. 1 is a schematic flowchart of a method for acquiring a texture of a 3D model according to embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiment(s)" or "certain embodiment(s)" describe subsets of all possible embodiments, but it may be understood that the "some embodiment(s)" or "certain embodiment(s)" may be the same subset or different subsets of all the possible embodiments, and can be combined with each other without conflict.

In certain embodiments, the term "based on" is employed herein interchangeably with the term "according to."

In the present disclosure, claims, and accompanying drawings of the present disclosure, the terms "first", "second", "third", "fourth", and so on (if existing) are intended to distinguish between similar objects rather than describe a specific order or sequence. It is to be understood that the data used in such a way is interchangeable in proper implementations, so that the embodiments described herein can be implemented in other orders than the order illustrated or described herein. Moreover, the terms "include" and "contain" and any other variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The face reconstruction technology is a technology that reconstructs a 3D face model from one or more 2D face images.

In specific work, the user takes a plurality of 2D pictures from different angles according to the instructions of a terminal. The 2D face images acquired through photographing include the color information and depth information of the pictures. In the process of 3D reconstruction, 3D points are back-projected from the depth information. The projected 3D points have a correspondence with pixels in the color information. After the 3D points projected from different 2D images are fused, a reconstructed 3D face model can be acquired. Finally, according to the correspondence, the pixels corresponding to the 3D points in the 3D face model are pasted on the 3D model, so that the texture mapping of the 3D model can be implemented, and the 3D model is colorful.

In the texture mapping process, after the step of fusing the 3D points, the correspondence between the 3D point and pixel may not be accurate enough. In addition, even if the correspondence is accurate enough, because the face is not a rigid body, images taken at various moments may not be ensured to be still (blinking and mouth twitching may occur), and these errors are smoothed out during the 3D reconstruction, resulting in the 3D model being unable to align with the pixels according to the correspondence. If there is a deviation in the correspondence, for example, a point on a nose tip in the 3D model corresponds to a pixel on a mouth in the color information, during the texture mapping process, a color in the mouth is mapped to the nose tip of the 3D model, resulting in a wrong texture in the 3D model.

Therefore, to resolve the problems, the embodiments of the present disclosure provide a method for acquiring a texture of a 3D model, which can update a correspondence between point cloud information and color information, to implement finer alignment between texture information and the 3D model. For ease of understanding, the following describes the method provided in the embodiments of the present disclosure in detail with reference to the accompanying drawings.

The method provided in the embodiments of the present disclosure may be applied to various different target objects such as a face, a toy, or a vehicle, which is not limited in the embodiments of the present disclosure. For ease of understanding, an example in which the target object is a face is used in the embodiments of the present disclosure for description.

Referring to FIG. 1, as shown in FIG. 1, Embodiment 1 of a method for acquiring a texture of a 3D model provided in an embodiment of the present disclosure includes the following steps.

101. Acquire at least two 3D networks generated by a target object based on a plurality of angles.

In this embodiment, a specific method for generating the 3D network is as follows.

1. Acquire at least two initial images of the target object at a plurality of shooting angles.

In this embodiment, the initial images are images of the target object taken from different angles, for example, face images taken in different angles by a user under the guidance of a terminal. The camera includes a depth lens, so that at least two initial images respectively record depth information of the face, and the depth information is used for recording a distance between each point of the target object and the camera.

In certain embodiment(s), the initial image may alternatively be acquired in another manner such as scanning, which is not limited in the embodiments of the present disclosure.

2. Perform back-projection in a 3D space according to the depth information in each initial image, to acquire first point cloud information corresponding to each initial image.

In this embodiment, points in the first point cloud information are used for recording 3D points of the target object, for example, when the target object is a face, a plurality of 3D points on a surface of the face are recorded in the first point cloud information.

3. Acquire a first correspondence between the 3D point and a pixel in color information.

In this embodiment, when the initial image is generated, the point recording the depth information is in a one-to-one correspondence with the pixel. After the depth information is projected as the 3D point, the point recording the depth information is projected as the 3D point in the 3D space. Therefore, the 3D point still maintains a correspondence, that is, the first correspondence with the pixel.

4. Generate the 3D network according to the first point cloud information and the first correspondence.

In this embodiment, the generated 3D network includes the first point cloud information, and the first correspondence between the 3D point in the first point cloud information and the pixel.

Therefore, in step 101, the at least two acquired 3D networks respectively include the first correspondence between the point cloud information and the color information of the target object (that is, the correspondence between the 3D point and the pixel), and first camera poses of the target object, the first camera pose being used for representing a movement of the target object relative to a camera in response to determining that different 3D networks are generated.

102. Move the at least two 3D networks to the same angle according to the first camera poses respectively included in the at least two 3D networks.

In this embodiment, each 3D network is a 3D point cloud set generated based on one initial image, and therefore can support 360-degree rotation. An angle of each 3D network can be known according to the poses of the camera recorded in the 3D network. Therefore, the plurality of 3D networks are moved to the same angle according to the first camera poses, to perform subsequent steps. In certain embodiment(s), a 3D network may be first set as a first frame. For example, a 3D network generated by a front face image of the user is used as a first frame, other 3D networks are then uniformly moved to an angle at which the first frame is located. A specific operation manner of the movement may be at least one of rotation or translation.

103. Acquire a second point closest to a first point in a first network.

In this embodiment, the first point and the second point are 3D points in two different 3D networks. For example, the first point is a point in the first network, the second point is a point in a second network, and the first network and the second network are two different 3D networks in the at least two 3D networks. Because the 3D networks are at the same angle, a point closest to a point belonging to another 3D network is likely to be a 3D point used for recording the same position of the target object.

104. Acquire an offset between the first point and the second point.

In this embodiment, when the second point is the point closest to the first point, and the second point and the first point do not overlap, the offset between the two points is acquired. The offset may be at least one of relative rotation or translation between the first point and the second point, and the offset may be acquired by acquiring the offset between the first point and the second point.

In this embodiment, because the shooting angles of the initial image are different when the 3D network is generated, there may be a certain deviation for the 3D points that record the same position of the target object. For example, a point A of the nose tip of the user is recorded in a 3D network generated by a front face picture, and a point B of the nose tip of the user is recorded in a 3D network generated by a side face picture. When rotated to the same angle, the point A and the point B may not overlap due to a deviation. In this implementation, the deviation between the point A and the point B is an offset between the two points.

105. Update the first correspondence according to the offset, to acquire a second correspondence between the point cloud information and the color information of the target object.

In this embodiment, because the offset exists between the two points recording the same position, a position of the point changes during the subsequent point cloud fusion process. For example, as described in the above example, in the 3D networks generated by the front face picture and the side face picture, there is an offset between the point A and the point B that are respectively used for recording the nose tip of the user, and after the point cloud fusion, the point A in the 3D network generated by the front face picture changes due to the offset. In this implementation, the point A may no longer be at the position of the nose tip of the user. According to the original first correspondence, the point A still corresponds to a pixel of the nose tip of the user. Therefore, the pixel corresponding to the point A may need to be updated according to the offset, to acquire the second correspondence.

106. Acquire a surface color texture of the 3D model of the target object according to the second correspondence.

In this embodiment, the second correspondence is an updated correspondence generated according to an offset between the 3D points in different 3D networks, which is closer to an actual correspondence between the 3D model and the pixel. In this implementation, a pixel on a surface of the 3D model is acquired according to the second correspondence, to acquire the surface color texture of the 3D model. A specific process may be as follows.

1. Acquire the pixels respectively corresponding to the 3D points of the 3D model according to the second correspondence.

In this embodiment, in the second correspondence, the 3D point is in a one-to-one correspondence with the pixel. Therefore, a pixel corresponding to each 3D point in the 3D network may be acquired according to the second correspondence.

2. Cover the pixels on the corresponding 3D points to implement texture mapping on the surface of the 3D model.

The acquired pixels are pasted on the corresponding 3D points, which can implement texture mapping on the surface of the 3D model, so that the 3D model is colorful.

The method for acquiring a texture of a 3D model provided in the embodiments of the present disclosure includes: acquiring at least two 3D networks generated by a target object based on different angles, the at least two 3D networks respectively including a first correspondence between point cloud information and color information of the target object, and first camera poses of the target object, the first camera pose being used for representing a movement of the target object relative to a camera in response to determining that different 3D networks are generated; acquiring an offset between 3D points used for recording the same position of the target object in different 3D networks according to the first camera poses; updating the first correspondence according to the offset, to acquire a second correspondence between the point cloud information and the color information of the target object; and acquiring a surface color texture of a 3D model of the target object according to the second correspondence. By updating the correspondence between the point cloud information and the color information, a more precise and subtle alignment between the 3D points and the pixels in the 3D model is realized, and an effect of texture mapping of the 3D model is improved.

Because there is a deviation between the 3D networks generated at different shooting angles, the offset may need to be acquired, and the offset is acquired by searching for the closest point. For a specific acquisition method for searching for the closest point, a more specific implementation is provided in the embodiments of the present disclosure, which is described in detail below with reference to the accompanying drawings.

Figure 2:
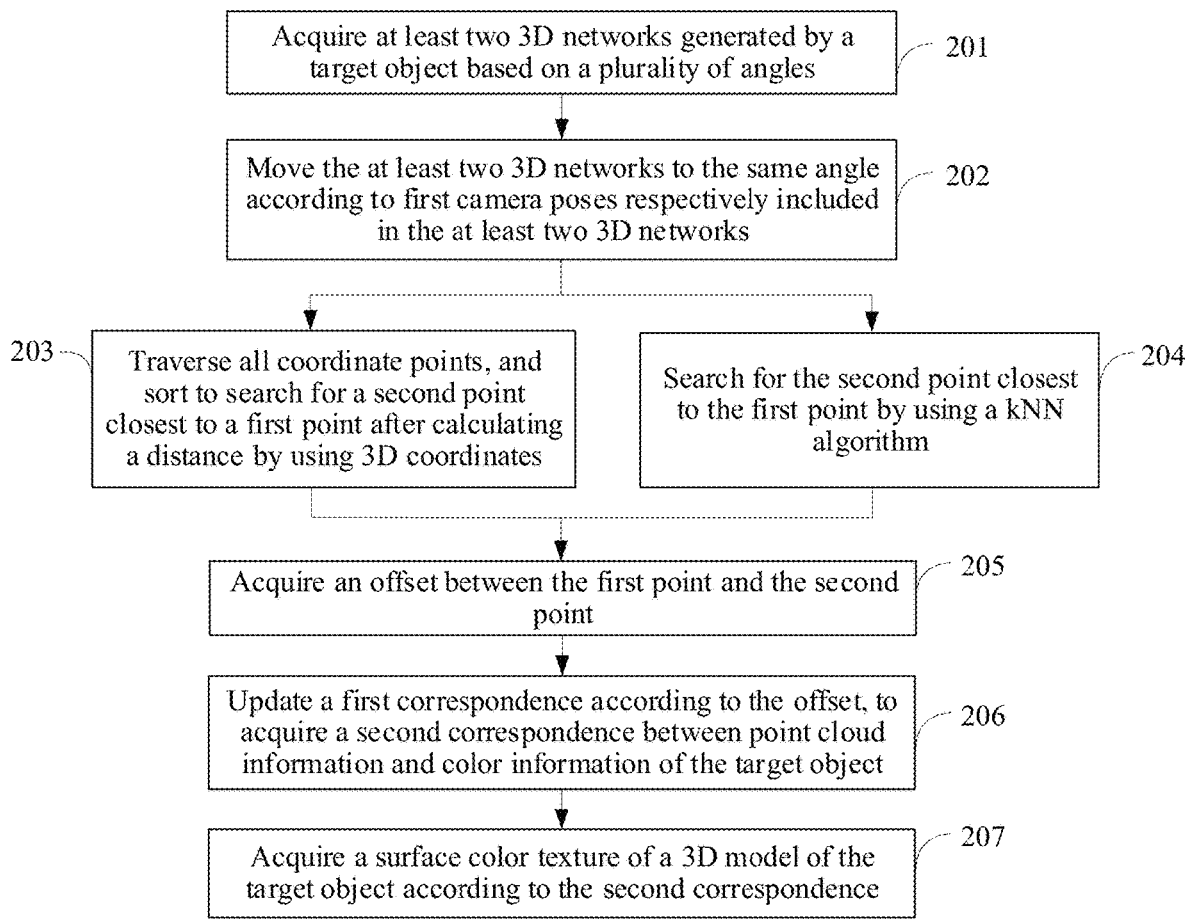
FIG. 2 is a schematic flowchart of a method for acquiring a texture of a 3D model according to embodiment(s) of the present disclosure.

Referring to FIG. 2, as shown in FIG. 2, Embodiment 2 of a method for acquiring a texture of a 3D model provided in an embodiment of the present disclosure includes the following steps.

201. Acquire at least two 3D networks generated by a target object based on a plurality of angles.

In this embodiment, for this step, reference may be made to step 101, and details are not described herein again.

202. Move the at least two 3D networks to the same angle according to first camera poses respectively included in the at least two 3D networks.

In this embodiment, for this step, reference may be made to step 102, and details are not described herein again. After step 202 is performed, the user may perform any of the following step 203 or 204 as may be needed.

203. Traverse coordinate points, and sort to search for a second point closest to a first point after calculating a distance by using 3D coordinates.

204. Search for the second point closest to the first point by using a k-Nearest Neighbor (kNN) algorithm.

For steps 205 to 207, reference may be made to steps 104 to 106, and details are not described herein again.

In the method provided in this embodiment of the present disclosure, points that record the same position of the target object and that between different 3D networks are acquired by searching for a closest point, so that an offset between the different 3D networks is acquired, thereby providing a more accurate basis for the subsequent update of the correspondence based on the offset, and providing accuracy of the correspondence between the point cloud information and the color information.

In Embodiment 2, for a specific implementation of acquiring the second point closest to the first point, a plurality of methods may be used, including but not limited to: I. Traversing the coordinate points, and sorting the coordinate points after calculating the distance by using the 3D coordinates. II. Using the kNN algorithm. For convenience, the two implementations are described in detail below.

I. Traverse the coordinate points, and sort the coordinate points after calculating the distance by using the 3D coordinates.

Figure 3:
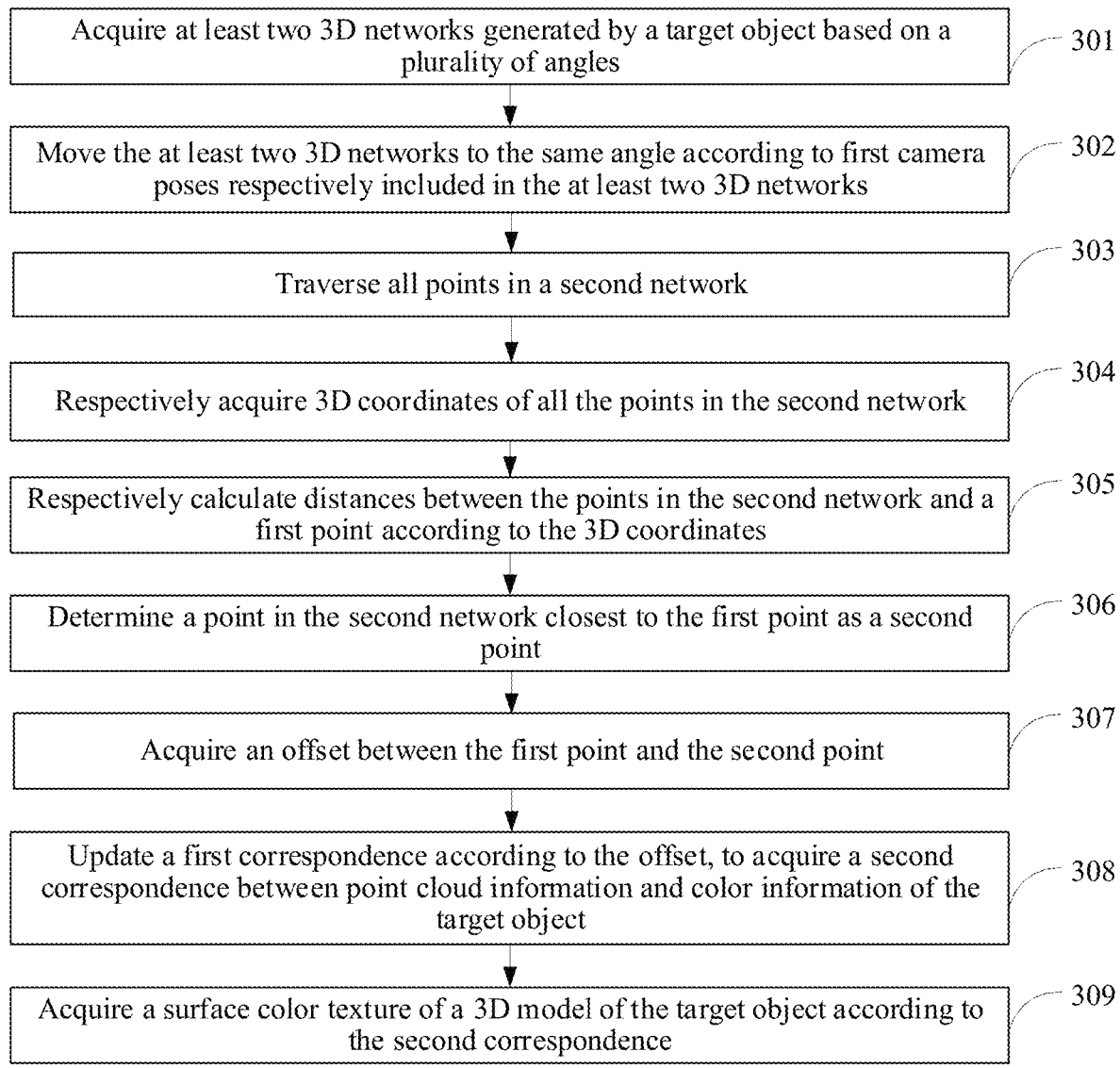
FIG. 3 is a schematic diagram of a method for acquiring a texture of a 3D model according to embodiment(s) of the present disclosure.

Referring to FIG. 3, as shown in FIG. 3, Embodiment 3 of a method for acquiring a texture of a 3D model provided in an embodiment of the present disclosure includes the following steps.

For steps 301 and 302, reference may be made to steps 201 and 202, and details are not described herein again.

303. Traverse points in the second network.

In this embodiment, the second network is one of the at least two 3D networks, and 3D points in the second network are acquired one by one, to traverse the points in the second network.

304. Respectively acquire 3D coordinates of the points in the second network.

In this embodiment, for acquired coordinate points in the second network, a 3D coordinate value (x, y, z) of each coordinate point is acquired.

305. Respectively calculate distances between the points in the second network and the first point according to the 3D coordinates.

In this embodiment, a 3D network in which the first point is located is a first network, that is, the second point and the first point are points in two different 3D networks. According to coordinate values of the 3D coordinates, the distances between the points in the second network and the first point in the first network may be calculated respectively.

306. Determine a point in the second network closest to the first point as the second point.

In this embodiment, sorting is performed according to calculation results of the distances, that is, the point closest to the first point in the second network as the second point is acquired according to sorted results, so that a point closest to the first point in the first network is found by traversing. This manner is repeated, and the same operation is performed on each point in the first network, to acquire points in the second network that are closest to the points in the first network.

The steps may alternatively be implemented in parallel for a plurality of 3D networks, and only one of the 3D networks (the first network) is as an example in the embodiment for description.

For subsequent steps 307 to 309, reference may be made to steps 204 to 206, and details are not described herein again.

In this embodiment, after the coordinate points are traversed, the closest point is acquired according to the coordinate values, so that another point closest to one point can be found more accurately. Meanwhile, because the coordinate values can provide accurate accuracy, in subsequent steps, the offset can also be accurately calculated according to the coordinate values, thereby realizing accurate update of the correspondence between the point cloud information and the color information.

Although the accuracy is relatively high in the manner provided in Embodiment 3, the manner of traversing the 3D points has higher requirements on hashrate, and may also require longer computing time. Therefore, to resolve this problem, another implementation is provided in this embodiment of the present disclosure.

II. Use the kNN algorithm. For convenience, the two implementations are described in detail below.

Figure 4:
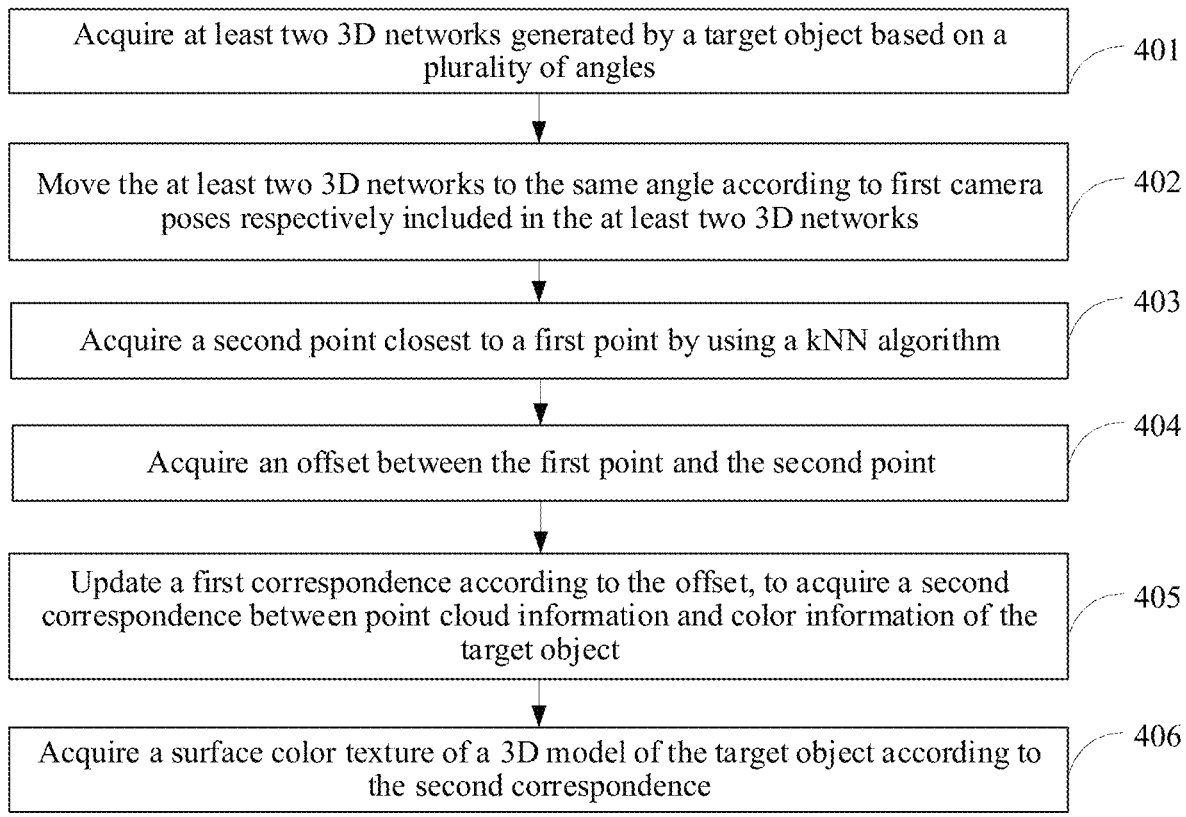
FIG. 4 is a schematic diagram of a method for acquiring a texture of a 3D model according to embodiment(s) of the present disclosure.

Referring to FIG. 4, as shown in FIG. 4, Embodiment 4 of a method for acquiring a texture of a 3D model provided in an embodiment of the present disclosure includes the following steps.

For steps 401 and 402, reference may be made to steps 201 and 202, and details are not described herein again.

403. Acquire a second point closest to a first point by using a kNN algorithm.

In this embodiment, a core idea of the kNN algorithm is that if most of k samples nearest a sample in a feature space belong to a certain category, the sample also belongs to this category and has the characteristics of the samples in this category. In a policy of determining a classification, the algorithm determines a category of a to-be-classified sample based on only a category of the nearest one or several samples. The kNN method is related to only a small number of adjacent samples in a policy of determining a category. Because the kNN method depends on the surrounding limited nearby samples to determine the category, rather than depending on a method of determining a class field, for the point cloud information involved in this embodiment of the present disclosure to process such a to-be-classified sample set with more intersections or overlaps of a class field, the KNN method is more suitable than other methods.

For subsequent steps 404 to 406, reference may be made to steps 204 to 206, and details are not described herein again.

In this embodiment, the kNN algorithm is used to search for the closest point, and the second point that is closest to the first point in the first network can be quickly found in the second network, thereby reducing hashrate resources and improving the efficiency of implementing the method for acquiring a texture of a 3D model.

In the method provided in the embodiments of the present disclosure, in an initial state, the following two sets of correspondences are involved.

I. First correspondence. In an initial image, there is a correspondence between a depth image and a color image, and in certain embodiment(s) is a correspondence between a point recoding depth information in the depth image and a pixel in the color image. After the point recoding the depth information in the depth image is projected as the point cloud information in a 3D space, a correspondence between a 3D point in the point cloud information and the pixel in the color image is the first correspondence.

II. Offset correspondence. For initial images taken from different angles of a target object, there is a certain deviation between 3D networks acquired finally, and there is a certain offset between 3D points recoding the same position of the target object in different 3D networks. For example, between a first network and a second network, a point A and a point B are points recoding a nose tip of a user, but there is an offset between the two points. Therefore, there is a correspondence between the point A and the point B based on the offset.

A core idea of the method provided in this embodiment of the present disclosure is to update the first correspondence through the offset correspondence, thereby improving the alignment of the pixel and the 3D point, and achieving more accurate texture mapping on the 3D model. For ease of understanding, a process of updating the first correspondence through the offset correspondence is described in detail below with reference to the accompanying drawings.

Figure 5:
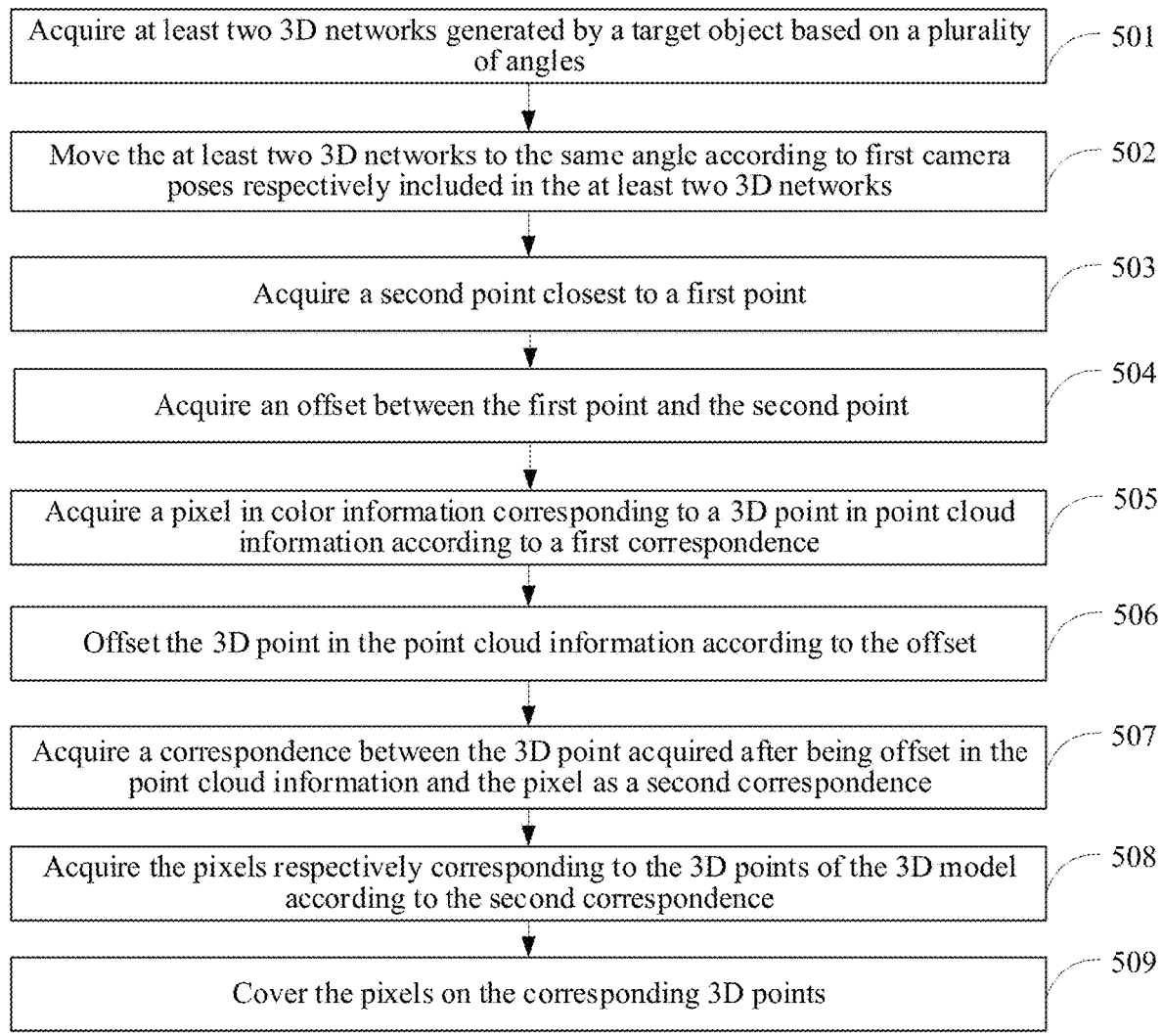
FIG. 5 is a schematic flowchart of a method for acquiring a texture of a 3D model according to embodiment(s) of the present disclosure.

Referring to FIG. 5, as shown in FIG. 5, Embodiment 5 of a method for acquiring a texture of a 3D model provided in an embodiment of the present disclosure includes the following steps.

For steps 501 to 504, reference may be made to steps 201 to 204. In certain embodiment(s), steps 501 to 504 may alternatively be implemented by using the method in Embodiment 3 or Embodiment 4, which is not limited in this embodiment of the present disclosure.

505. Acquire a pixel in color information corresponding to a 3D point in point cloud information according to a first correspondence.

In this embodiment, when an initial 3D network is acquired, there is a first correspondence between the 3D point and the pixel, which can be acquired directly herein.

506. Offset the 3D point in the point cloud information according to the offset.

In this embodiment, step 506 may be implemented in the following manner.

1. Acquire a rotation matrix R and a translation matrix T in the offset.

In this embodiment, R is used for representing a rotation operation between the 3D networks, and T is used for representing a translation operation between the 3D networks, so that the offset between the 3D points may be quantified by using the two matrices.

2. Offset the 3D points by executing a formula $D1=(R|T) \times D2$.

In this embodiment, D1 is point cloud information in a 3D network, and D2 is information in another 3D network. An offset of the point cloud information between the two 3D networks is implemented according to the offset.

507. Acquire a correspondence between the 3D point acquired after being offset in the point cloud information and the pixel as a second correspondence.

In this embodiment, a position of the point acquired after being offset is an actual position of the 3D point after the 3D networks are fused into a 3D model. In this implementation, based on the 3D point acquired after being offset, a correspondence between the 3D point at this position and the pixel is reconfirmed, thereby updating the first correspondence to the second correspondence, and realizing the alignment of the 3D point and the pixel.

The steps 503 to 507 may be executed not only once, but may be executed for a plurality of times and iterated repeatedly. The correspondence is more accurate after each iteration, and the specific number of iterations depends on the accuracy expected to be acquired.

508. Acquire the pixels respectively corresponding to the 3D points of the 3D model according to the second correspondence.

In this embodiment, a pixel corresponding to each 3D point in the 3D model may be acquired according to the updated second correspondence.

509. Cover the pixels on the corresponding 3D points.

In this embodiment, the pixels are covered on the corresponding 3D points to implement texture mapping on a surface of the 3D model. In certain embodiment(s), specific technical details in the process of implementing texture mapping belong to the technical solutions in the related art. Based on the second correspondence, a person skilled in the art can independently select a specific implementation of texture mapping, which is not limited in this embodiment of the present disclosure.

Further, this embodiment of the present disclosure further provides a specific implementation of a method for acquiring a texture of a 3D model in actual work. For ease of understanding, detailed descriptions are provided below with reference to the accompanying drawings.

Figure 6:
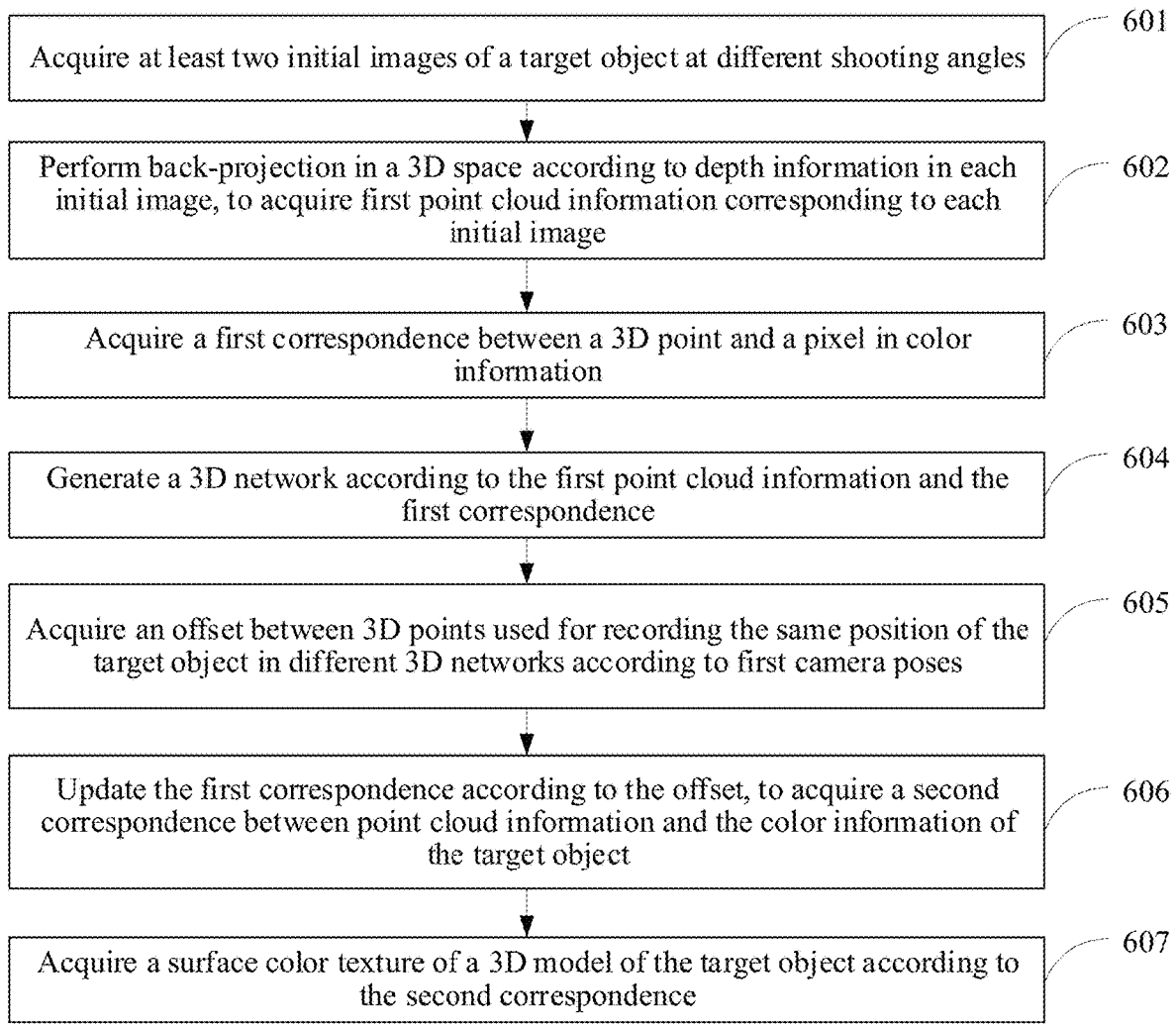
FIG. 6 is a schematic flowchart of a method for acquiring a texture of a 3D model according to embodiment(s) of the present disclosure.

Referring to FIG. 6, as shown in FIG. 6, Embodiment 6 of a method for acquiring a texture of a 3D model provided in an embodiment of the present disclosure includes the following steps.

601. Acquire at least two initial images of the target object at different shooting angles.

Figure 7:
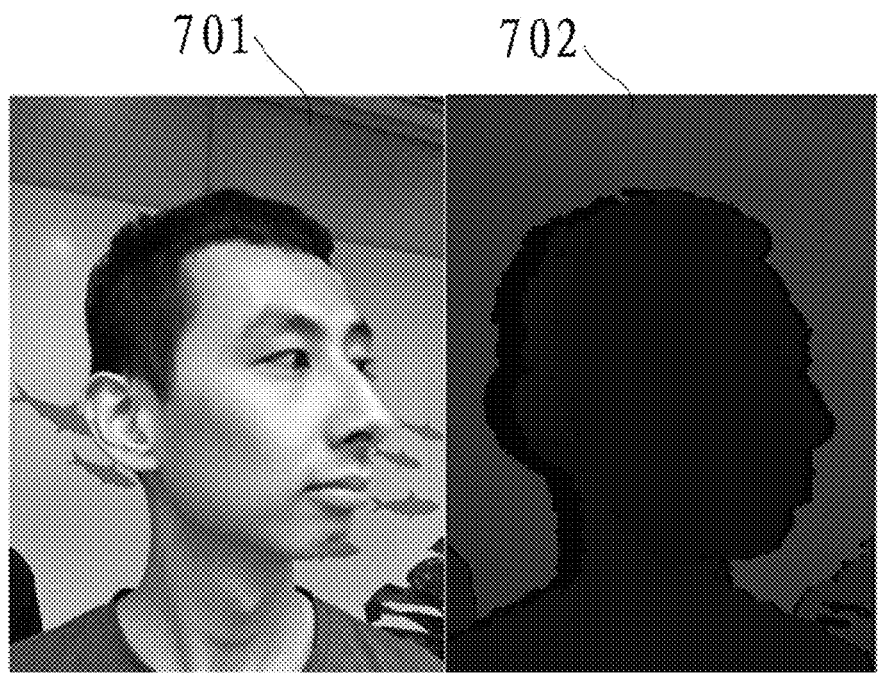
FIG. 7 is a schematic diagram of a color image and a depth image of a method for acquiring a texture of a 3D model according to embodiment(s) of the present disclosure.

In this embodiment, referring to FIG. 7, FIG. 7 shows images of a side face of a user in the at least two acquired initial images, respectively including a color image 701 and a depth image 702. The color image 701 records pixels used for expressing a color texture, and the depth image 702 records points used for expressing depth information, that is, a distance between each point in the image and a camera.

602. Perform back-projection in a 3D space according to the depth information in each initial image, to acquire first point cloud information corresponding to each initial image.

Figure 8:
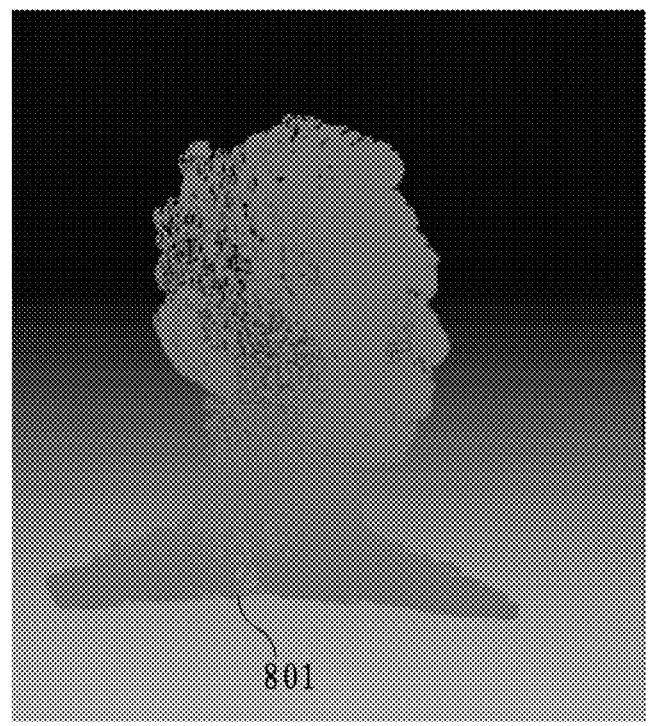
FIG. 8 is a schematic diagram of first point cloud information of a method for acquiring a texture of a 3D model according to embodiment(s) of the present disclosure.

In this embodiment, based on the depth image 702 in FIG. 7, first point cloud information 801 shown in FIG. 8 is acquired by projecting in the 3D space.

603. Acquire a first correspondence between a 3D point and a pixel in color information.

In this embodiment, the first point cloud information 801 is in a one-to-one correspondence with a point in the depth image 702, and the point in the depth image 702 is also in a one-to-one correspondence with a pixel in the color image 701. Therefore, the first correspondence between the 3D point and the pixel in the color information may be acquired according to the correspondence.

604. Generate a 3D network according to the first point cloud information and the first correspondence.

In this embodiment, the generated 3D network is a network shown in FIG. 8, except for that the first correspondence and information about a camera pose of the target object are also recorded in the 3D network.

605. Acquire an offset between 3D points used for recording the same position of the target object in different 3D networks according to first camera poses.

In this embodiment, for a specific method for acquiring the offset, reference may be made to any one of the implementations, and details are not described herein again.

606. Update the first correspondence according to the offset, to acquire a second correspondence between the point cloud information and the color information of the target object.

In this embodiment, for a manner of updating based on the first correspondence to acquire the second correspondence, reference may be made to any one of the implementations, and details are not described herein again.

607. Acquire a surface color texture of the 3D model of the target object according to the second correspondence.

Figure 9:
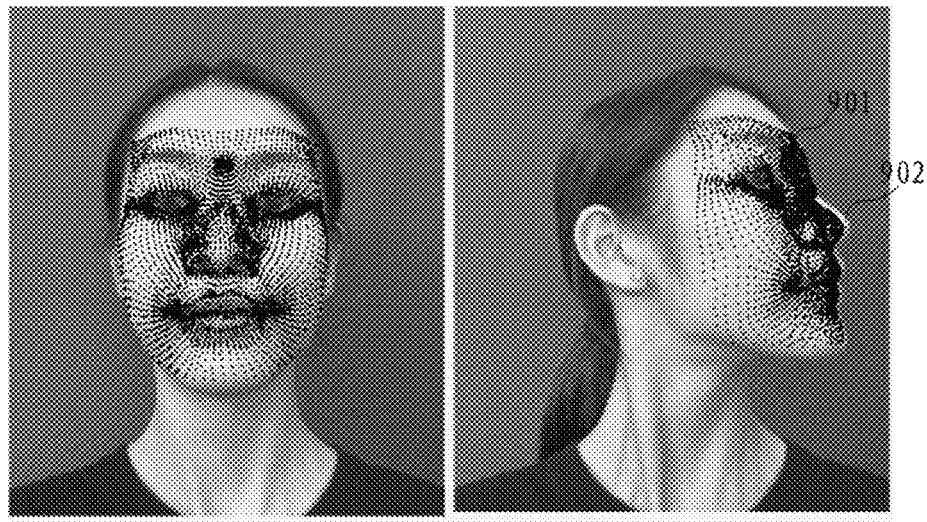
FIG. 9 is a schematic alignment effect diagram of a pixel network covering a user face in the related art.
Figure 10:
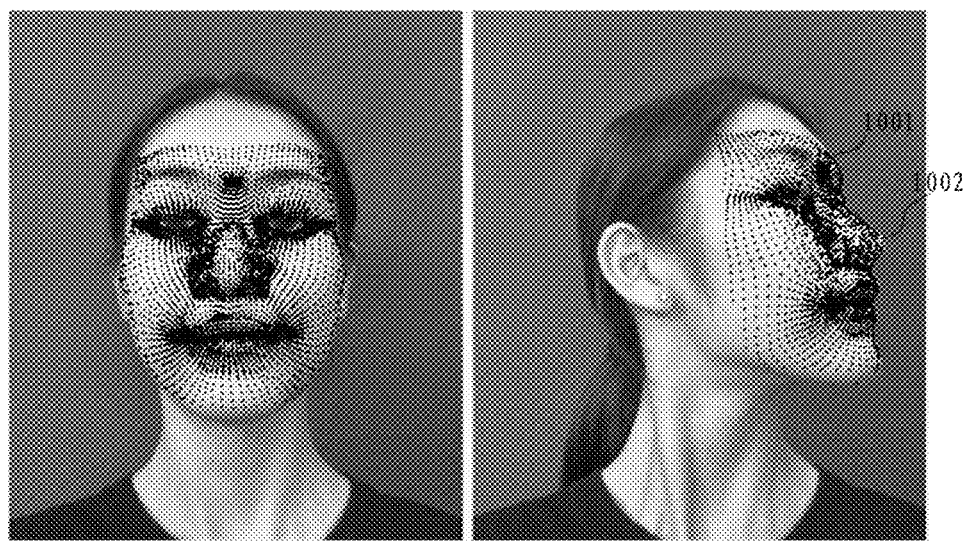
FIG. 10 is a schematic alignment effect diagram of a pixel network covering a user face of a method for acquiring a texture of a 3D model according to embodiment(s) of the present disclosure.

In this embodiment, for this step, reference may be made to any one of the implementations, and details are not described herein again. As shown in FIG. 9, FIG. 9 shows a correspondence between point cloud information and a pixel network 901 formed by pixels in a color image in the related art. It may be seen from FIG. 9 that because a correspondence between the point cloud information and color information is not updated, at positions such as a nose tip 902, the 3D model is smoothed during the modeling process, resulting in a certain offset, so that the pixel network 901 cannot be aligned with these areas. After being processed by the method provided in the embodiments of the present disclosure, as shown in FIG. 10, it may be seen that a nose tip area 1002 can be covered by a pixel network 1001. After the correspondence is updated in the method provided in the embodiments of the present disclosure, the range of the face can be more accurately covered by the pixel network 1001.

A method for acquiring a texture of a 3D model provided in the embodiments of the present disclosure includes: acquiring at least two 3D networks generated by a target object based on different angles, the at least two 3D networks respectively including a first correspondence between point cloud information and color information of the target object, and first camera poses of the target object, the first camera pose being used for representing a movement of the target object relative to a camera in response to determining that different 3D networks are generated; acquiring an offset between 3D points used for recording the same position of the target object in different 3D networks according to the first camera poses; updating the first correspondence according to the offset, to acquire a second correspondence between the point cloud information and the color information of the target object; and acquiring a surface color texture of a 3D model of the target object according to the second correspondence. By updating the correspondence between the point cloud information and the color information, a more precise and subtle alignment between the 3D points and the pixels in the 3D model is realized, and an effect of texture mapping of the 3D model is improved.

Described herein are the solutions provided in the embodiments of the present disclosure. To implement the functions, the computing device includes corresponding hardware structures and/or software modules for performing the functions. A person skilled in the art may be easily aware that, modules and algorithm steps in the examples described with reference to the embodiments disclosed in the present disclosure can be implemented by hardware or a combination of hardware and computer software in the present disclosure. Whether a function is performed by hardware or computer software driving hardware depends on particular implementations and design constraints of the technical solutions. A person skilled in the art may use different methods to implement the described functions for each particular implementation, but it is not to be considered that the implementation goes beyond the scope of the present disclosure.

In terms of a hardware structure, the method may be implemented by one physical device, or may be jointly implemented by a plurality of physical devices, or may be a logical functional module in a physical device. This is not limited in this embodiment of the present disclosure.

Figure 11:
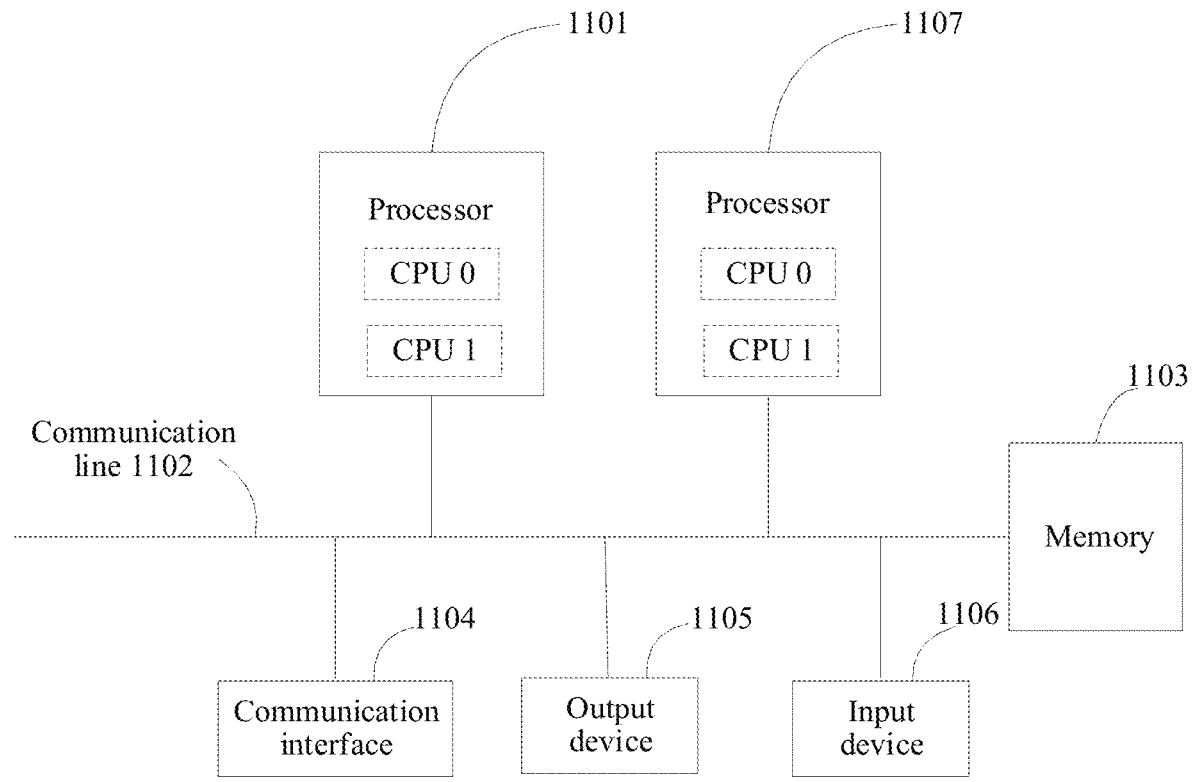
FIG. 11 is a schematic diagram of a computing device according to embodiment(s) of the present disclosure.

For example, the methods may be implemented by the computing device in FIG. 11. FIG. 11 is a schematic structural diagram of hardware of a computing device according to an embodiment of the present disclosure. The computing device includes at least one processor 1101, a communication line 1102, a memory 1103, and at least one communication interface 1104.

The processor 1101 may be a general-purpose central processing unit (CPU), a microprocessor, an application-specific integrated circuit (ASIC), or one or more integrated circuits configured to control execution of a program in the solutions of the present disclosure.

The communication line 1102 may include a channel, to transmit information between the components.

The communication interface 1104 is an apparatus using any transceiver or the like, to communicate with another device or a communication network such as an Ethernet, a radio access network (RAN), or a wireless local area network (WLAN).

The memory 1103 may be a read-only memory (ROM) or another type of static storage device that can store static information and instructions, a random access memory (RAM) or another type of dynamic storage device that can store information and instructions, or may be an electrically erasable programmable read-only memory (EEPROM) or a compact disc read-only memory (CD-ROM) or another compact disc storage, optical disc storage (including compressed optical discs, laser discs, optical discs, digital versatile optical discs, and Blu-ray discs), magnetic disk storage media, or another magnetic storage device, or any another medium that can be used to carry or store desired program code in the form of an instruction or a data structure and that can be accessed by a computer, but is not limited thereto. The memory may exist independently, and is connected to the processor through the communication line 1102. The memory may further be integrated with the processor.

The memory 1103 is configured to store computer-executable instructions for performing the solutions of the present disclosure, and is controlled and executed by the processor 1101. The processor 1101 is configured to execute the computer-executable instructions stored in the memory 1103 to implement the method provided in the embodiments of the present disclosure.

In certain embodiment(s), the computer executable instructions in this embodiment of the present disclosure may also be referred to as application code. This is not limited in this embodiment of the present disclosure.

During specific implementation, in an embodiment, the processor 1101 may include one or more CPUs, for example, a CPU 0 and a CPU 1 in FIG. 11.

During specific implementation, in an embodiment, the computing device may include a plurality of processors, such as the processor 1101 and the processor 1107 in FIG. 11. Each of these processors may be a single-core (single-CPU) processor, or may be a multi-core (multi-CPU) processor. The processor herein may be one or more devices or circuits, and/or a processing core configured to process data (for example, computer executable instructions).

During specific implementation, in an embodiment, the computing device may further include an output device 1105 and an input device 1106. The output device 1105 communicates with the processor 1101, and can display information in a plurality of manners. For example, the output device 1105 may be a liquid crystal display (LCD), a light-emitting diode (LED) display device, a cathode ray tube (CRT) display device, a projector, or the like. The input device 1106 communicates with the processor 1101, and can receive user input in a plurality of manners. For example, the input device 1106 may be a mouse, a keyboard, a touchscreen device, a sensor device, or the like.

The computing device may be a general-purpose device or a special-purpose device. During specific implementation, the computing device may be a desktop computer, a portable computer, a network server, a palmtop computer (personal digital assistant, PDA)), a mobile phone, a tablet computer, a wireless terminal device, an embedded device, or a device with a similar structure in FIG. 11. The type of the computing device is not limited in the embodiments of the present disclosure.

In the embodiments of the present disclosure, functional units of the storage device may be divided based on the method examples. For example, the functional units may be divided in such a way that each functional unit corresponds to a specific function, or two or more functions may be integrated into one processing unit. The integrated unit may be implemented in the form of hardware, or may be implemented in the form of a software functional unit. Unit division in the embodiments of the present disclosure is an example, and is only logical function division. In an actual implementation, there may be another division manner.

Figure 12:
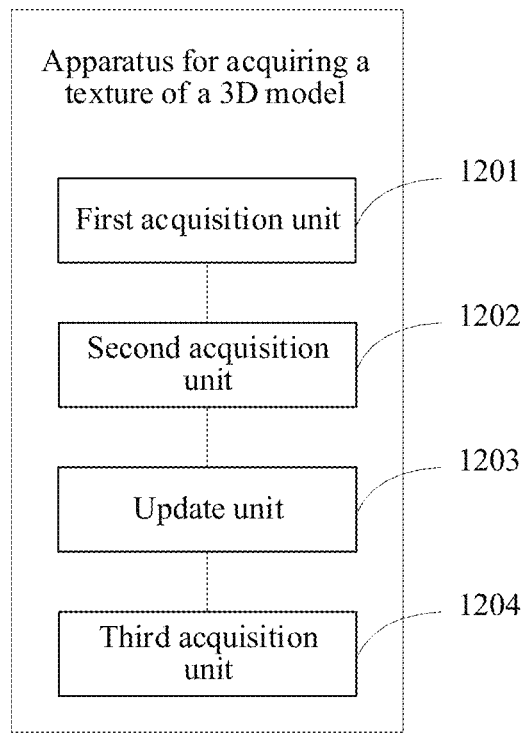
FIG. 12 is a schematic diagram of an apparatus for acquiring a texture of a 3D model according to embodiment(s) of the present disclosure.

For example, in response determining that the functional units are divided in an integrated manner, FIG. 12 shows a schematic diagram of an apparatus for acquiring a texture of a 3D model.

As shown in FIG. 12, the apparatus for acquiring a texture of a 3D model provided in an embodiment of the present disclosure includes: a first acquisition unit 1201, configured to acquire at least two 3D networks generated by a target object based on a plurality of angles, the 3D networks including a first correspondence between point cloud information and color information of the target object, and first camera poses of the target object, the first camera pose being used for representing a displacement of the target object relative to a reference position in response to determining that the 3D network is generated; a second acquisition unit 1202, configured to: move the at least two 3D networks acquired by the first acquisition unit 1201 to a same angle according to the first camera poses respectively included in the at least two 3D networks; acquire a second point closest to a first point in a first network, the second point being in a second network, and the first network and the second network being respectively different 3D networks of the at least two 3D networks; and acquire an offset between the first point and the second point; an update unit 1203, configured to update the first correspondence according to the offset acquired by the second acquisition unit 1202, to acquire a second correspondence between the point cloud information and the color information of the target object; and a third acquisition unit 1204, configured to acquire a surface color texture of a 3D model of the target object according to the second correspondence acquired by the update unit 1203.

In certain embodiment(s), the second acquisition unit 1202 is further configured to: traverse points in the second network; respectively acquire 3D coordinates of the points in the second network; respectively calculate distances between the points in the second network and the first point according to the 3D coordinates; and determine a point in the second network closest to the first point as the second point.

In certain embodiment(s), the second acquisition unit 1202 is further configured to: acquire the second point closest to the first point by using a kNN algorithm.

In certain embodiment(s), the update unit 1203 is further configured to: acquire a pixel in the color information corresponding to a 3D point in the point cloud information according to the first correspondence; offset the 3D point in the point cloud information according to the offset; and acquire a correspondence between the 3D point acquired after being offset in the point cloud information and the pixel as the second correspondence.

In certain embodiment(s), the offset includes a rotation matrix R used for representing a rotation operation and a translation matrix T used for representing a translation operation, and the update unit 1203 is further configured to: execute the following formula: D1=(R|T)×D2, D1 being point cloud information in a 3D network, and D2 being information in another 3D network.

In certain embodiment(s), the third acquisition unit 1204 is further configured to: acquire the pixels respectively corresponding to the 3D points of the 3D model according to the second correspondence; and cover the pixels on the corresponding 3D points to implement texture mapping on a surface of the 3D model.

In certain embodiment(s), the first acquisition unit 1201 is further configured to: acquire at least two initial images of the target object at different shooting angles, the at least two initial images respectively recording depth information of the target object, the depth information being used for recording a distance between each point of the target object and the reference position, and the reference position being a position of a camera that photographs the target object; perform back-projection in a 3D space according to the depth information in each initial image, to acquire first point cloud information corresponding to each initial image, points in the first point cloud information being used for recording the 3D points of the target object; acquire the first correspondence between the 3D point and the pixel in the color information; and generate the 3D network according to the first point cloud information and the first correspondence.

In addition, an embodiment of the present disclosure further provides a storage medium, the storage medium being configured to store a computer program, the computer program being configured to perform the method according to the embodiments.

An embodiment of the present disclosure further provides a computer program product including instructions, the computer program product, when run on a computer, causing the computer to perform the method according to the embodiments.

For detailed descriptions of the program stored in the computer storage medium provided in this embodiment of the present disclosure, reference may be made to the embodiments, and details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The embodiments in the present disclosure are described in a progressive manner. Description of each of the embodiments focuses on differences from other embodiments, and reference may be made to each other for the same or similar parts among the embodiments. The apparatus embodiments basically correspond to the method embodiments and therefore are only briefly described, and reference may be made to the method embodiments for the associated part.

A person skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the descriptions. Whether the functions are executed in a mode of hardware or software depends on particular implementations and design constraint conditions of the technical solutions. A person skilled in the art may use different methods to implement the described functions for each particular implementation, but it is not to be considered that the implementation goes beyond the scope of the present disclosure.

In combination with the embodiments disclosed herein, steps of the method or algorithm described may be directly implemented by using hardware, a software module executed by a processor, or the combination thereof. The software module may be placed in a RAM, a memory, a ROM, an electrically programmable ROM (EPROM), an EEPROM, a register, a hard disk, a removable magnetic disk, a CD-ROM, or any storage medium of other forms well-known in the art.

The description of the disclosed embodiments enables a person skilled in the art to implement or use the present disclosure. Various modifications to the embodiments are obvious to a person skilled in the art, and general principles defined in the present disclosure may be implemented in other embodiments without departing from the spirit or scope of the present disclosure. Therefore, the present disclosure is not limited to, these embodiments illustrated in the display disclosure, but may need to conform to the broadest scope consistent with the principles and novel features disclosed in the display disclosure.

What is claimed is:

1. A method for acquiring a texture of a three-dimensional (3D) model, performed by a computing device, the method comprising:

acquiring at least two 3D networks generated based on a target object according to a plurality of angles, the at least two 3D networks including a first correspondence between point cloud information and color information of the target object, and first camera poses of the target object, the first camera pose being used for representing a displacement of the target object relative to a reference position in response to determining that the 3D network is generated;

moving the at least two 3D networks to a same angle according to the first camera poses respectively included in the at least two 3D networks;

acquiring a second point closest to a first point in a first network, the second point being in a second network, and the first network and the second network being respectively different 3D networks of the at least two 3D networks;

acquiring an offset between the first point and the second point;

updating the first correspondence according to the offset, to acquire a second correspondence between the point cloud information and the color information of the target object; and acquiring a surface color texture of a 3D model of the target object according to the second correspondence.

2. The method according to claim 1, wherein acquiring the second point closest to the first point in the first network comprises:

traversing points in the second network;
respectively acquiring 3D coordinates of the points in the second network;
respectively calculating distances between the points in the second network and the first point according to the 3D coordinates; and
determining a point closest in the second network to the first point as the second point.

3. The method according to claim 1, wherein acquiring the second point closest to the first point in the first network comprises:
acquiring the second point closest to the first point by using a k-Nearest Neighbor (kNN) algorithm.

4. The method according to claim 1, wherein updating the first correspondence comprises:
acquiring a pixel in the color information corresponding to a 3D point in the point cloud information according to the first correspondence;
offsetting the 3D point in the point cloud information according to the offset; and
acquiring a correspondence between the 3D point acquired after being offset in the point cloud information and the pixel as the second correspondence.

5. The method according to claim 4, wherein the offset includes a rotation matrix R used for representing a rotation operation and a translation matrix T used for representing a translation operation, and offsetting the 3D point in the point cloud information according to the offset comprises:
executing the following formula: D1=(R|T)×D2,
D1 being point cloud information in a 3D network, and D2 being information in another 3D network.

6. The method according to claim 4, wherein acquiring the surface color texture of the 3D model of the target object comprises:
acquiring the pixels respectively corresponding to the 3D points of the 3D model according to the second correspondence; and
covering the pixels on the corresponding 3D points to implement texture mapping on a surface of the 3D model.

7. The method according to claim 1, wherein acquiring the at least two 3D networks comprises:
acquiring at least two initial images of the target object at a plurality of shooting angles, the at least two initial images respectively recording depth information of the target object, the depth information being used for recording a distance between each point of the target object and the reference position, and the reference position being a position of a camera that photographs the target object;
performing back-projection in a 3D space according to the depth information in each initial image, to acquire first point cloud information corresponding to each initial image, points in the first point cloud information being used for recording the 3D points of the target object;
acquiring the first correspondence between the 3D point and the pixel in the color information; and
generating the 3D network according to the first point cloud information and the first correspondence.

8. An apparatus for acquiring a texture of a three-dimensional (3D) model, comprising: a memory storing computer program instructions; and a processor coupled to the memory and configured to execute the computer program instructions and perform:
acquiring at least two 3D networks generated based on a target object according to a plurality of angles, the at least two 3D networks including a first correspondence between point cloud information and color information of the target object, and first camera poses of the target object, the first camera pose being used for representing a displacement of the target object relative to a reference position in response to determining that the 3D network is generated;
moving the at least two 3D networks to a same angle according to the first camera poses respectively included in the at least two 3D networks;
acquiring a second point closest to a first point in a first network, the second point being in a second network, and the first network and the second network being respectively different 3D networks of the at least two 3D networks;
acquiring an offset between the first point and the second point;
updating the first correspondence according to the offset, to acquire a second correspondence between the point cloud information and the color information of the target object; and
acquiring a surface color texture of a 3D model of the target object according to the second correspondence.

9. The apparatus according to claim 8, wherein the processor is further configured to execute the computer program instructions and perform:
traversing points in the second network;
respectively acquire 3D coordinates of the points in the second network;
respectively calculate distances between the points in the second network and the first point according to the 3D coordinates; and
determine a point in the second network closest to the first point as the second point.

10. The apparatus according to claim 8, wherein the processor is further configured to execute the computer program instructions and perform:
acquiring the second point closest to the first point by using a k-Nearest Neighbor (kNN) algorithm.

11. The apparatus according to claim 8, wherein the processor is further configured to execute the computer program instructions and perform:
acquiring a pixel in the color information corresponding to a 3D point in the point cloud information according to the first correspondence;
offsetting the 3D point in the point cloud information according to the offset; and
acquiring a correspondence between the 3D point acquired after being offset in the point cloud information and the pixel as the second correspondence.

12. The apparatus according to claim 11, wherein the offset includes a rotation matrix R used for representing a rotation operation and a translation matrix T used for representing a translation operation, and offsetting the 3D point in the point cloud information according to the offset includes:
executing the following formula: D1=(R|T)×D2,
D1 being point cloud information in a 3D network, and D2 being information in another 3D network.

13. The apparatus according to claim 11, wherein acquiring the surface color texture of the 3D model of the target object includes:
acquiring the pixels respectively corresponding to the 3D points of the 3D model according to the second correspondence; and
covering the pixels on the corresponding 3D points to implement texture mapping on a surface of the 3D model.

14. The apparatus according to claim 8, wherein acquiring the at least two 3D networks includes:
  acquiring at least two initial images of the target object at a plurality of shooting angles, the at least two initial images respectively recording depth information of the target object, the depth information being used for recording a distance between each point of the target object and the reference position, and the reference position being a position of a camera that photographs the target object;
  performing back-projection in a 3D space according to the depth information in each initial image, to acquire first point cloud information corresponding to each initial image, points in the first point cloud information being used for recording the 3D points of the target object;
  acquiring the first correspondence between the 3D point and the pixel in the color information; and
  generating the 3D network according to the first point cloud information and the first correspondence.

15. A non-transitory computer-readable storage medium storing computer program instructions executable by at least one processor to perform:
  acquiring at least two 3D networks generated based on a target object according to a plurality of angles, the at least two 3D networks including a first correspondence between point cloud information and color information of the target object, and first camera poses of the target object, the first camera pose being used for representing a displacement of the target object relative to a reference position in response to determining that the 3D network is generated;
  moving the at least two 3D networks to a same angle according to the first camera poses respectively included in the at least two 3D networks;
  acquiring a second point closest to a first point in a first network, the second point being in a second network, and the first network and the second network being respectively different 3D networks of the at least two 3D networks;
  acquiring an offset between the first point and the second point;
  updating the first correspondence according to the offset, to acquire a second correspondence between the point cloud information and the color information of the target object; and
  acquiring a surface color texture of a 3D model of the target object according to the second correspondence.

16. The non-transitory computer-readable storage medium according to claim 15, wherein acquiring the second point closest to the first point in the first network includes:
  traversing points in the second network;
  respectively acquiring 3D coordinates of the points in the second network;
  respectively calculating distances between the points in the second network and the first point according to the 3D coordinates; and
  determining a point closest in the second network to the first point as the second point.

17. The non-transitory computer-readable storage medium according to claim 15, wherein acquiring the second point closest to the first point in the first network includes:
  acquiring the second point closest to the first point by using a k-Nearest Neighbor (kNN) algorithm.

18. The non-transitory computer-readable storage medium according to claim 15, wherein updating the first correspondence includes:
  acquiring a pixel in the color information corresponding to a 3D point in the point cloud information according to the first correspondence;
  offsetting the 3D point in the point cloud information according to the offset; and
  acquiring a correspondence between the 3D point acquired after being offset in the point cloud information and the pixel as the second correspondence.

19. The non-transitory computer-readable storage medium according to claim 18, wherein the offset includes a rotation matrix R used for representing a rotation operation and a translation matrix T used for representing a translation operation, and offsetting the 3D point in the point cloud information according to the offset comprises:
  executing the following formula: $D1=(R|T) \times D2$,
  D1 being point cloud information in a 3D network, and D2 being information in another 3D network.

20. The non-transitory computer-readable storage medium according to claim 19, wherein acquiring the surface color texture of the 3D model of the target object includes:
  acquiring the pixels respectively corresponding to the 3D points of the 3D model according to the second correspondence; and
  covering the pixels on the corresponding 3D points to implement texture mapping on a surface of the 3D model.

* * * * *